US010938909B2

(12) United States Patent
Yang et al.

(10) Patent No.: US 10,938,909 B2
(45) Date of Patent: Mar. 2, 2021

(54) REUSABLE DEVICE MANAGEMENT IN MACHINE-TO-MACHINE SYSTEMS

(71) Applicant: Intel Corporation, Santa Clara, CA (US)

(72) Inventors: Shao-Wen Yang, San Jose, CA (US); Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/062,106

(22) PCT Filed: Dec. 26, 2015

(86) PCT No.: PCT/US2015/000391
§ 371 (c)(1),
(2) Date: Jun. 13, 2018

(87) PCT Pub. No.: WO2017/111833
PCT Pub. Date: Jun. 29, 2017

(65) Prior Publication Data
US 2018/0367616 A1    Dec. 20, 2018

(51) Int. Cl.
*H04L 29/08* (2006.01)
*H04W 4/70* (2018.01)
(Continued)

(52) U.S. Cl.
CPC ............ *H04L 67/12* (2013.01); *H04L 67/34* (2013.01); *H04W 4/50* (2018.02); *H04W 4/70* (2018.02);
(Continued)

(58) Field of Classification Search
CPC .......... H04L 67/12; H04L 67/34; H04W 4/70; H04W 4/50; H04W 67/34; H04W 8/005
(Continued)

(56) References Cited

U.S. PATENT DOCUMENTS

| 10,305,817 B1* | 5/2019 | Tan | ......................... H04L 47/10 |
| 2007/0109100 A1* | 5/2007 | Jett | ..................... G06K 7/10366 340/10.4 |

(Continued)

FOREIGN PATENT DOCUMENTS

| CN | 102047629 A | 5/2011 |
| CN | 102113389 A | 6/2011 |

(Continued)

OTHER PUBLICATIONS

International Preliminary Report on Patentability in International Application No. PCT/U32015/000391, dated Jun. 26, 2018, 8 pages.

(Continued)

*Primary Examiner* — James E Springer
(74) *Attorney, Agent, or Firm* — Alliance IP, LLC

(57) ABSTRACT

A plurality of devices are detected within range of a particular device, and capabilities of each of the plurality of devices are determined, as well as a respective taxonomy to be associated with each device based on the device's capabilities. A set of asset abstractions are identified, referenced by a particular software application configured to manage a particular machine-to-machine network. Each asset abstraction can correspond to a respective one of the set of taxonomies, and the particular machine-to-machine network can be built from an instance of each one of the set of asset abstractions. A subset of the plurality of devices can be selected for deployment in the particular machine-to-machine network based on the associated taxonomies, the subset of devices representing an instance of each one of the set of asset abstractions. The subset of devices are then automatically deployed to implement the instance of the particular machine-to-machine network.

21 Claims, 10 Drawing Sheets

(51) Int. Cl.
*H04W 4/50* (2018.01)
*H04W 8/00* (2009.01)
*H04W 24/02* (2009.01)
*H04W 8/22* (2009.01)

(52) U.S. Cl.
CPC .............. *H04W 8/005* (2013.01); *H04W 8/22* (2013.01); *H04W 24/02* (2013.01)

(58) Field of Classification Search
USPC ......................................................... 709/223
See application file for complete search history.

(56) References Cited

U.S. PATENT DOCUMENTS

| | | | |
|---|---|---|---|
| 2008/0320539 | A1 | 12/2008 | Ohkita |
| 2012/0136944 | A1 | 5/2012 | Stewart et al. |
| 2012/0188870 | A1 | 7/2012 | Eisenhauer et al. |
| 2013/0070739 | A1 | 3/2013 | McCann et al. |
| 2014/0229622 | A1* | 8/2014 | Supalov ................ G06F 9/5044 709/226 |
| 2014/0241354 | A1* | 8/2014 | Shuman ................ H04L 67/16 370/390 |
| 2014/0280802 | A1 | 9/2014 | McDowall |
| 2015/0358777 | A1* | 12/2015 | Gupta ................ H04L 12/2807 370/254 |
| 2016/0036764 | A1* | 2/2016 | Dong ................ H04L 61/3025 370/254 |
| 2016/0057020 | A1* | 2/2016 | Halmstad ................ H04L 67/26 715/740 |
| 2016/0117238 | A1* | 4/2016 | Collier ................ G06F 8/71 717/101 |
| 2016/0119249 | A1* | 4/2016 | Ayachitula ............ H04L 67/104 709/226 |
| 2017/0005871 | A1* | 1/2017 | Smith ................... H04L 63/062 |
| 2017/0342741 | A1* | 11/2017 | Holland ................. H04W 4/70 |
| 2018/0338280 | A1* | 11/2018 | Zakaria ............ H04W 52/0212 |

FOREIGN PATENT DOCUMENTS

| | | |
|---|---|---|
| CN | 103907091 A | 7/2014 |
| CN | 104255046 A | 12/2014 |
| CN | 104615001 A | 5/2015 |

OTHER PUBLICATIONS

International Search Report and Written Opinion in International Application No. PCT/US2015/000391, dated Aug. 24, 2016, 10 pages.

Zhijing Qin et al., 'A software defined networking architecture for the internet-of-things.' In: 2014 IEEE Network Operations and Management Symposium (NOMS), May 5-9, 2014, pp. 1-9.

SIPO; First Office Action issued in CN Patent Application No. 201580084877.6, dated Dec. 7, 2020; 13 pages including English translation.

* cited by examiner

REUSABLE DEVICE MANAGEMENT IN MACHINE-TO-MACHINE SYSTEMS

CROSS-REFERENCE TO RELATED APPLICATIONS

This application is a national stage application under 35 U.S.C. § 371 of PCT International Application Serial No. PCT/US2015/000391, filed on Dec. 26, 2015, and entitled REUSABLE DEVICE MANAGEMENT IN MACHINE-TO-MACHINE SYSTEMS. The disclosure of the prior application is considered part of and is hereby incorporated by reference in its entirety in the disclosure of this application.

TECHNICAL FIELD

This disclosure relates in general to the field of computer systems and, more particularly, to data analytics.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

Like reference numbers and designations in the various drawings indicate like elements.

DETAILED DESCRIPTION OF EXAMPLE EMBODIMENTS

Figure 1:
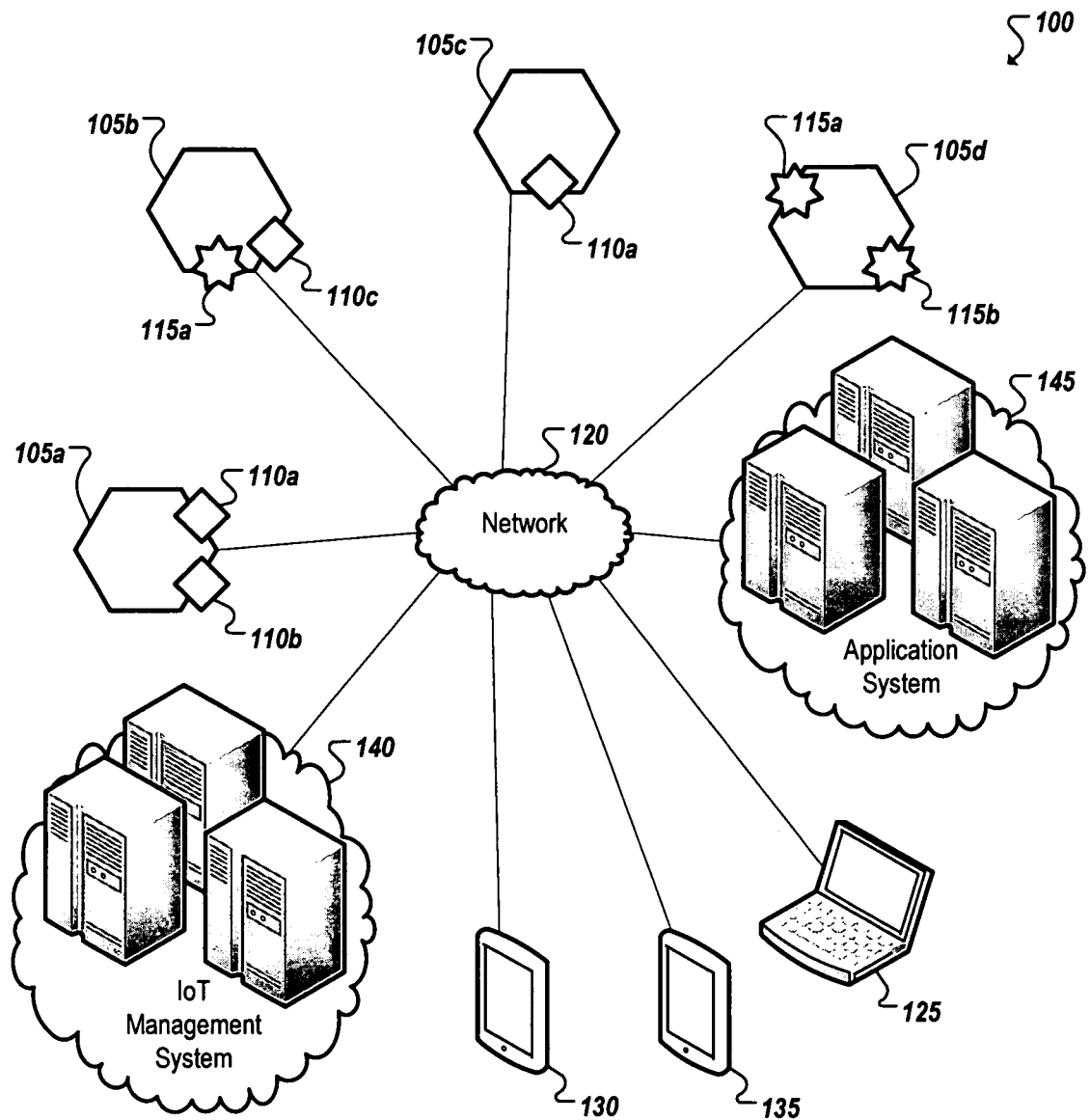
FIG. 1 illustrates an embodiment of a system including multiple sensor devices and an example data management system.

FIG. 1 is a block diagram illustrating a simplified representation of a system 100 that includes one or more devices 105a-d, or assets, deployed throughout an environment. Each device 105a-d may include a computer processor and/or communications module to allow each device 105a-d to interoperate with one or more other devices (e.g., 105a-d) or systems in the environment. Each device can further include one or more instances of various types of sensors (e.g., 110a-c), actuators (e.g., 115a-b), storage, power, computer processing, and communication functionality which can be leveraged and utilized (e.g., by other devices or software) within a machine-to-machine, or Internet of Things (IoT) system or application. Sensors are capable of detecting, measuring, and generating sensor data describing characteristics of the environment in which they reside, are mounted, or are in contact with. For instance, a given sensor (e.g., 110a-c) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110a-c) as described herein, anticipate the development of a potentially limitless universe of various sensors, each designed to and capable of detecting, and generating corresponding sensor data for, new and known environmental characteristics. Actuators (e.g., 115a-b) can allow the device to perform some kind of action to affect its environment. For instance, one or more of the devices (e.g., 105b, d) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

In some implementations, sensors 110a-c and actuators 115a-b provided on devices 105a-d can be incorporated in and/or embody an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1, multiple IoT devices (e.g., 105a-d) can be provided from which one or more different IoT applications can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1, software-based IoT management platforms can be provided to allow developers and end users to build and configure IoT applications and systems. An IoT application can provide software support to organize and manage the operation of a set of IoT device for a particular purpose or use case. In some cases, an IoT application can be embodied as an application on an operating system of a user computing device (e.g., 120) or a mobile app for execution on a smart phone, tablet, smart watch, or other mobile device (e.g., 125, 130). In some cases, the application can have an application-specific management utility allowing users to configure settings and policies to govern how the set devices (e.g., 105a-d) are to operate within the context of the application. A management utility can also be used to select which devices are used with the application. In other cases, a dedicated IoT management application can be provided which can manage potentially multiple different IoT applications or systems. The IoT management application, or system, may be hosted on a single system, such as a single server system (e.g., 140) or a single end-user device (e.g., 125, 130, 135). Alternatively, an IoT management system can be distributed across multiple hosting devices (e.g., 125, 130, 135, 140, etc.).

In some cases, applications can be programmed, or otherwise built or configured, utilizing interfaces of an IoT management system. In some cases, the interfaces can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). Further, IoT application systems built using the IoT management system can be sharable, in that a user can send data identifying the built system to another user, allowing the other user to simply port the abstracted system definition to the other user's environment (even when the combination of device models is different from that of the original user's system). Additionally, system or application settings, defined by a given user, can be configured to be sharable with other users or portable between different environments, among other example features.

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 145). For instance, the IoT system can connect to a remote service over one or more networks 120. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120) can facilitate communication between sensor devices (e.g., 105a-d), end user devices (e.g., 123, 130, 135), and other systems (e.g., 140, 145) utilized to implement and manage IoT applications in an environment. Such networks can include wired and/or wireless local networks, public networks, wide area networks, broadband cellular networks, the Internet, and the like.

In general, "servers," "clients," "computing devices," "network elements," "hosts," "system-type system entities," "user devices," "sensor devices," and "systems" (e.g., 105a-d, 125, 130, 135, 140, 145, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

With the growth of IoT devices and system, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

Some device management applications may be configured with preset settings designed to allow users to set up their systems quickly and with minimal work configuring the device. However, those settings may not be universally desirable, potentially limiting their flexibility and overall utility. In cases, where settings are configurable, a user may nonetheless struggle to make sense of the ideal combination of setting values, resorting to trial and error to figure out the optimal settings for their system (e.g., smart home, office, car, etc.). Indeed, the combination of settings that is ideal or optimal to one user may be subjective, however, other users may still be interested in the setting values determined by others which yielded these other users desirable results. For instance, a guest of a first user may observe, first hand, the configuration of the first user's system and desire to recreate the attributes of the observed system in their own system. However, in traditional systems, system settings are typically not portable due given that they are usually tied to identities of devices.

In traditional systems, each IoT device has its own device's unique media access control (MAC) address or other device identifier. User-customized settings may be tied to a specified device present in the system when the settings were first configured. However, in traditional systems, when a user replaces this device with another (e.g., newer) substitute device, the user is often required to reconfigure the device settings (including device identifier and device MAC address) in the application.

In some implementations, a system can be provided with improved IoT management functionality to address at least some of the example issues introduced above. Generally, an improved IoT management system can simplify deployment of IoT devices through asset abstraction to significantly reduce the human touch points during deployment and redeployment. For instance, IoT management and applications can adopt a paradigm where, instead of referencing and being programmed to interoperate with specific IoT devices, the system can refer to abstracted classes, or taxonomies, of IoT devices (or "assets"). Asset abstraction can be leveraged to automatically configure a deployed IoT system with minimal human intervention. Indeed, in some instances, configuration of the system can progress without a user having to actually specify which device to use. Instead, a deployment policy can be used instead by the system to automatically select and configure at least a portion of the devices within the system. Further, asset abstraction can facilitate addressing the challenge of portability of IoT applications, which has traditionally limited the general scalability and resiliency of IoT applications.

Asset abstraction can be coupled with automated asset binding, in some cases, to eliminate the necessity of including a device/asset's unique ID in an IoT application or management program. Asset discovery provided with the application or management program can provide an effective means for specifying policy and confining the scope of asset binding. Through the combination of asset discovery, asset abstraction, and asset binding makes IoT applications portable, reusable and sharable.

In some implementations, with asset abstraction, assets are treated indifferently as long they fall into a same category in the taxonomy, e.g., occupancy sensing, image capture, computation, etc. An IoT application, consequently, can be made portable, reusable and sharable, as it can be written and stored in a way that specifies only requirements (e.g., references to abstracted device taxonomies providing the requirements) without specifying the precise identity (or catalogue of identities) of compatible devices meant to provide these requirements. Asset discovery allows all available resources to be searched to detect those meeting the requirements and further selected, in some instances, on the basis of customizable or policy-based criteria.

Figure 2:
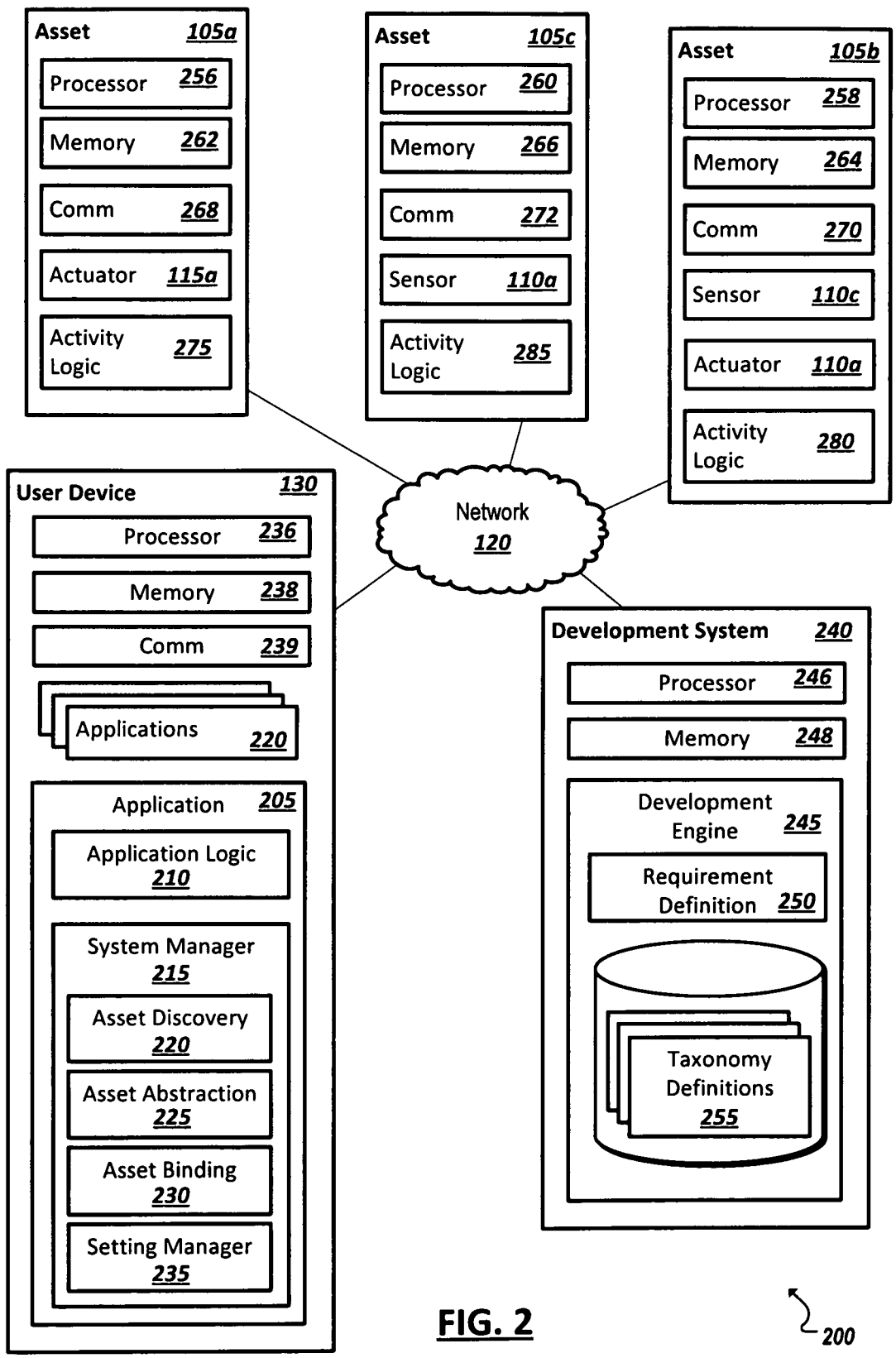
FIG. 2 illustrates an embodiment of a system including an example data management system.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple IoT devices, or assets (e.g., 105a-c) capable of being used in a variety of different IoT applications. In the example of FIG. 2, a particular IoT application 205 is hosted on an endpoint device (e.g., 130) that itself includes an IoT system manager 215 for use in identifying and deploying an IoT system for use with the application logic 210 of the application 205. In other implementations, a system manager 215 can be provided separate from the application 205.

In the particular example of FIG. 2, the system manager 215 can include an asset discovery module 220. The asset discovery module 220 can include functionality for determining which IoT devices are within range of each other, or within range of the device (e.g., 130) hosting the system manager 215. In some implementations, the system manager 215 can make use of the wireless communication capabilities of the host device 130 to attempt to communicate with devices within a particular radius. For instance, devices within range of a WiFi or Bluetooth signal emitted from the communications module(s) 239 of the host device 130 (or the communications module(s) (e.g., 268, 270, 272) of the assets (e.g., 105a-c)) can be detected. Additional attributes can be considered by the asset discovery module 220 when determining whether a device is suitable for inclusion in a listing of devices for a given system or application. In some implementations, conditions can be defined for determining whether a device should be included in the listing. For instance, the asset discovery module 220 may attempt to identify, not only that it is capable of contacting a particular asset, but may also determine assets such as physical location, semantic location, temporal correlation, movement of the device (e.g., is it moving in the same direction and/or rate as the discovery module's host), permissions or access level requirements of the device, among other characteristics. As an example, in order to deploy smart lighting control for every room in a home- or office-like environment, an application may be deployed in a "per room basis." Accordingly, the asset discovery module 220 can determine a listing of devices that are identified (e.g., through a geofence or semantic location data reported by the device) as within a particular room (despite the asset discovery module 220 being able to communicate with and detect other devices falling outside the desired semantic location). Conditions for discovery can be defined in the IoT application (e.g., 205) itself or may be configurable such that a user can custom-define at least some of the conditions. Additionally, in some examples, different discovery conditions can be defined for different asset types (or taxonomies), as appropriate. For instance, a remote service may be a perfectly acceptable asset to utilize for one asset taxonomy used in an application, where the proximity of the service's host can be ignored, while proximity may be (e.g., in the very same system) an important factor for other types of assets, such as a sensor, actuator, etc.

A system manager 215 can also include an asset abstraction module 225. An asset abstraction module 225 can recognize defined mappings between specific IoT devices or, more generally, specific functionality that may be included in any one of a variety of present or future IoT devices with a collection of defined taxonomies, or asset abstractions for the devices. The asset abstraction module 225 can determine, for each asset discovered by an asset discovery module 220 (e.g., according to one or more conditions), a respective asset abstraction, or taxonomy, to which the asset "belongs". Each taxonomy can correspond to a functional capability of an asset. Assets known or determined to possess the capability can be grouped within the corresponding taxonomy. Some multi-function assets may be determined to belong to multiple of the taxonomies. The asset abstraction module 225 can, in some cases, determine the abstraction(s) to be applied to a given asset based on information received from the asset (e.g., during discovery by asset discovery module 220). In some cases, the asset abstraction module can obtain identifiers from each asset and query a backend database for pre-determined abstraction assignments corresponding to that make and model of asset, among other examples. Further, in some implementations, the asset abstraction module 225 can query each asset (e.g., according to a defined protocol) to determine a listing of the capabilities of the asset, from which the asset abstraction module 225 can map the asset to one or more defined abstraction taxonomies. Asset abstraction module 225 allows the application to treat every asset falling within a given taxonomy as simply an instance of that taxonomy, rather than forcing the system manager 215 to be configured specifically to a precise device model. Asset abstraction module 225 can access a taxonomy framework (defined on an application-, system-, or universal-basis) that abstracts away the precise device into taxonomies including higher- and lower-level taxonomies for sensing, actuating, computation, storage, and other taxonomies. With asset abstraction, assets are treated indifferently as long they fall into a same category in the taxonomy, e.g., occupancy sensing. An IoT application (e.g., 205) and its settings, through asset abstraction, can be made portable, reusable and sharable, as the application 205 can be written and stored in a way that specifies only asset requirements (i.e., taxonomies) without their specific identity information.

A system manager 215 can also include an asset binding module 230 which can select, from the discovered assets, which assets to deploy for a system. In some cases, upon selecting an asset, the asset binding module 230 can cause the corresponding asset to be configured for use with the application 205. This can involve provisioning the asset with corresponding code (e.g., to allow it to communicate and interoperate with the application 205 and/or other assets), logging in, unlocking, or otherwise enabling the asset, sending session data to or requesting a session with the asset, among other examples. In cases where multiple assets of the same taxonomy have been identified (and exceed a maximum desired number of instances of the taxonomy), the asset binding module 230 can additionally assess which of the assets is the best fit with the application 205. For instance, the application 205 can define criteria indicating desirable attributes of assets utilized in the application 205. These criteria can be global criteria, applying to instances of every taxonomy, or can be taxonomy-specific (i.e., only applying to decisions between assets within the same taxonomy). Asset binding can provision the assets specified by the IoT application (e.g., 205) for deployment automatically (before or during runtime). Portions of the application (e.g., 205) can be distributed on one or more of the assets in some implementations. Once assets are provisioned, the deployed assets can be used collectively for achieving the goals and functionality designed for the application (e.g., 205).

A system manager 215 can additionally provide functionality (e.g., through setting manager 235) to allow users define settings to be applied to the selected asset taxonomies (or requirements) of the application 210 and the application 210 generally. A variety of different settings can be provided depending on the collection of assets to be used by the application and the overall objectives of the application. Default setting values can be defined and further tools can be provided to allow users to define their own values for the settings (e.g., a preferred temperature setting of an air conditioned, the number of second to lock a smart lock or locker, sensitivity setting utilized for triggering a motion sensor and control, etc.). What settings constitute the "ideal" may be subjective and involve some tinkering by the user. When the user is satisfied with the settings, the user may save the settings as a configuration. In some implementations, these configurations can be stored locally (e.g., at device 130) or on the cloud. In some cases, configurations can be shared, such that a user can share the settings they found ideal with other users (e.g., friends or social network contacts, etc.). Configuration data can be generated from which the settings are automatically readopted at runtime by the system manager 215, each time the application is to deploy the assets it discovers. Consequently, while specific devices are loosely tied to the user's instance of the application (as they are abstracted away), settings can be strongly tied to the user, such that the user may migrate between environments, including environments with different sets of assets that are bound to the application at runtime. Regardless of the specific device identifiers or implementations selected to satisfy the abstracted asset requirements of the application, the same settings can be applied (e.g., as the settings, too, are directed to the abstractions of the assets (i.e., rather than specific assets)). To the extent a particular setting does not apply to a selected instance of a taxonomy, the setting can be ignored. If a selected instance of a taxonomy possesses settings that are undefined by the user in the configuration (e.g., because they are unique to the particular asset), default values for these settings can be automatically set or the user can be alerted that these settings are undefined, among other examples.

A setting manager 235 can be used in runtime to cause the settings to be applied at the IoT devices (assets) selected for deployment with the application 205. The system manager 215 may include logic enabling the system manager 215 (and its composite modules) to communicate using a variety of different protocols with a variety of different devices. Indeed, the system manager 215 can even be used to translate between protocols to facilitate to asset-to-asset communications. Further, the setting manager 235 can send instructions to each of the selected assets for deployment to prompt each asset to adjust settings in accordance with those defined for the asset taxonomy in the setting configuration defined by the user. Other settings can address settings of the application or system manager, and applying such settings can be accomplished in an automated and straightforward manner at the device(s) (e.g., 130) hosting the application 205 and system manager 215, among other examples.

A device (e.g. 130) hosting an application 205 with an IoT system manager 215 can include one or more processors, one or more memory elements 238, among other components. In some implementations, the IoT application 205 be one of several applications (e.g., 220) hosted at least in part on the device (e.g., 130). In some implementations, the IoT system manager 215 may be an application separate from application 205. Indeed, as noted above, in some implementations, the system manager 215 can be hosted on a device separate from the device (e.g., 130) hosting the application (e.g., 205) for which the system manager 215 is to automatically deploy and provision a corresponding IoT system.

As noted above, asset abstraction can assist not only in easing the deployment of a system, but also in the programming of IoT applications. For instance, a development system 240 can be provided. The development system 240 can include one or more processors 246 and one or more memory elements 248 utilized to implement a development engine 245. The development engine 245 can provide traditional programming tools for use in coding an application. In some instances, the development engine 245 can instead, or additionally, include declarative programming tools allowing users, including novice programmers, to specify generalized or abstracted requirements of the IoT application (e.g., using requirement definition component 250), expressed as collections of asset taxonomies. The user may additional declare relationships between two or more of the selected taxonomies to indicate input-output, sensor-actuator, or other relationships that are to be automatically defined in corresponding application code. In either implementation, the development engine 245 can allow IoT applications (e.g., 205) to be developed using asset abstractions (e.g., based on taxonomy definitions 255). In some implementations, functionality of a development system can be incorporated in an IoT system manager (e.g., 215), or vice versa.

Continuing with the description of FIG. 2, each of the IoT devices (e.g., 105*a-c*) may include one or more processors (e.g., 256, 258, 260), one or more memory elements (e.g., 262, 264, 266), and one or more communications modules (e.g., 268, 270, 272) to facilitate their participation in an IoT application. Each device (e.g., 105*a-c*) can possess unique hardware and other logic (e.g., 275, 280, 285) to realize the intended function(s) of the device. For instance, devices may be provided with such resources as sensors of varying types (e.g., 110*a*, 110*c*), actuators (e.g., 115*a*) of varying types, energy modules (e.g., batteries, solar cells, etc.), computing resources (e.g., through a respective processor and/or software logic), security features, data storage, and other resources.

Figure 3A:
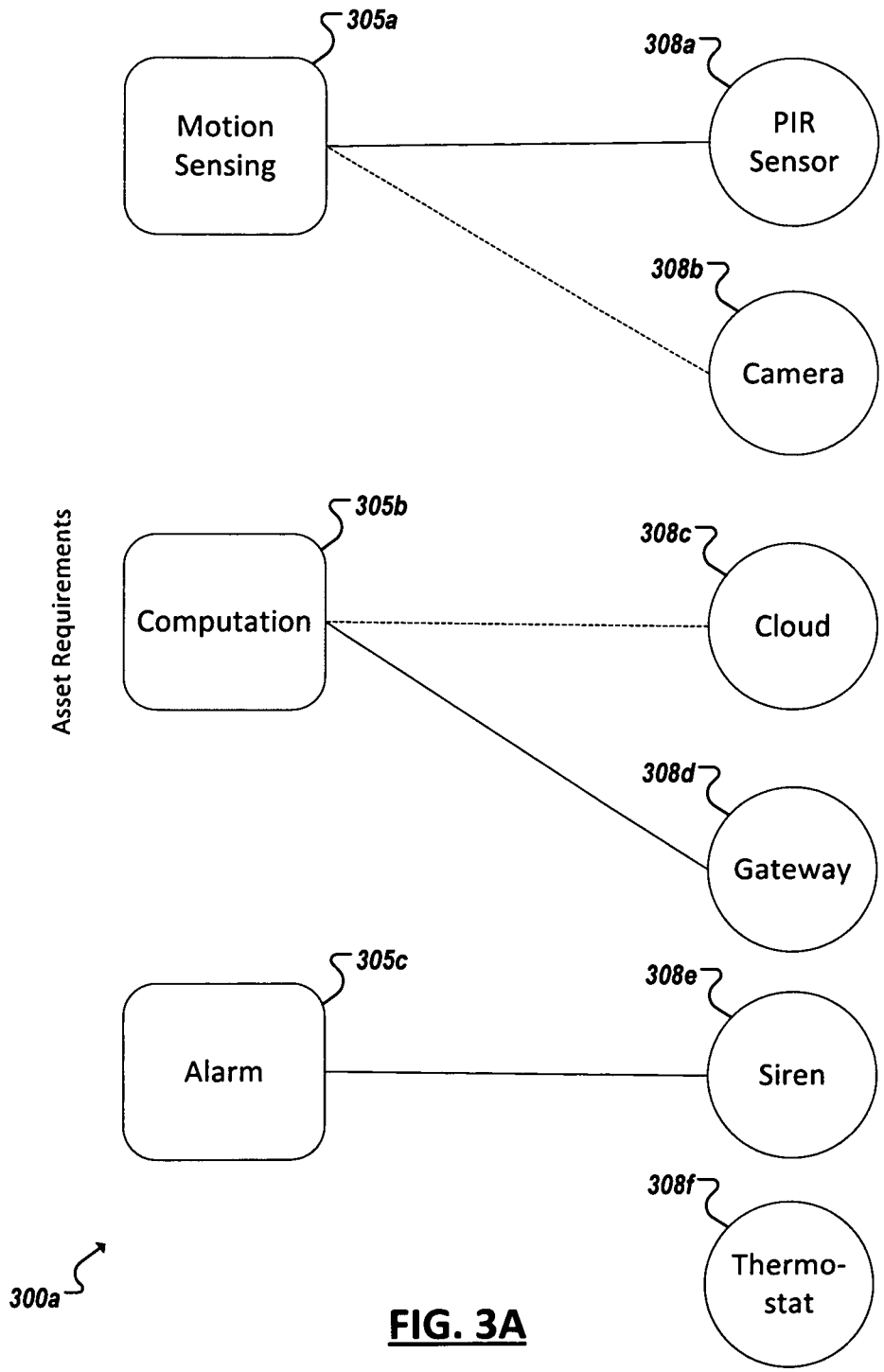
FIG. 3A is a simplified block diagram illustrating an example of asset abstraction and binding.

Turning to FIG. 3A, a simplified block diagram 300*a* is shown representing a simplified example of asset abstraction. A variety of different taxonomies can be defined at varying levels. For instance, a sensor taxonomy can be a parent to a multitude of specific sensor-type taxonomies (e.g., child taxonomies for light sensing, motion sensing, temperature sensing, liquid sensing, noise sensing, etc.), among other examples. In the example of FIG. 3A, an IoT application has been defined to include three asset requirements, represented by taxonomies Motion Sensing 305*a*, Computation 305*b*, and Alarm 305*c*. During asset discovery, a variety of assets (e.g., 308*a-f*) can be identified as usable by the application (e.g., based on the assets meeting one or more defined discovery conditions). One or more corresponding taxonomies, or abstractions, can be identified (e.g., by an IoT management system) for each of the assets 308*a-f*. Some of the abstractions may not have relevance to the asset requirements and function of the application, such as an abstraction (e.g., Temperature Sensor and/or HVAC Actuator) determined for thermostat device 308*f*. Other asset abstractions may match the abstractions (e.g., 305*a-c*) designated in the IoT application as asset requirements of the application. Indeed, more than one discovered asset may be fit one of the asset requirements. For instance, in the example of FIG. 3A, a PIR sensor 308*a* and camera 308*b* are each identified as instances of a motion sensing asset taxonomy 305*a*. Similarly, a cloud-based computing resource 308*c* and network gateway 308*d* are identified as instances of a computation asset taxonomy 305*b*. In other instances, there may be just a single discovered device satisfying an application asset requirement (e.g., siren 308*e* of the alarm taxonomy 305*c*), among other examples.

Conventionally, IoT and wireless sensor network (WSN) applications have been developed to intricately define dataflow among a determined set of physical devices, which involves device-level discovery in development time to obtain and hardcode the corresponding device identifiers and characteristics. By utilizing asset abstraction, development can be facilitated to allow the devices to be discovered and determined at runtime (e.g., at launch of the application), additionally allowing the application to be portable between systems and taxonomy instances. Further, development can be expedited by allowing developers to merely specify asset requirements (e.g., 305a-c), without the necessity to understand radio protocol, network topology, and other technical features.

In one example, taxonomies for asset abstraction can involve such parent taxonomies as sensing assets (e.g., light, presence, temperature sensors, etc.), actuation (e.g., light, HVAC, machine controllers, etc.), power (e.g., battery-powered, landline-powered, solar-powered, etc.), storage (e.g., SD, SSD, cloud storage, etc.), computation (e.g., microcontroller (MCU), central processing unit (CPU), graphical processing (GPU), cloud, etc.), and communication (e.g., Bluetooth, ZigBee, WiFi, Ethernet, etc.), among other potential examples. Discovering which devices possess which capabilities (and belong to which taxonomies) can be performed using varied approaches. For instance, some functions (e.g., sensing, actuating, communication) may be obtained directly from signals received from the device by the system management system via a common descriptive language (e.g., ZigBee's profiles, Bluetooth's profiles and Open Interconnect Consortium's specifications), while other features (e.g., power, storage, computation) may be obtained through deeper queries (utilizing resources on top of the operating system of the queried device), among other examples.

Asset binding can be applied to determine which discovered assets (fitting the asset requirements (abstractions) defined for an application) are to actually be deployed. Criteria can be defined at development time and/or before/at runtime by the application's user, which an IoT system manager (e.g., 215) can consult to perform the binding. For instance, as shown in FIG. 3A, according to the criteria set forth for the application (or for a particular session using the application), one of multiple matching assets for a required taxonomy can be selected. For instance, between PIR sensor 308a and camera 308b, corresponding criteria (e.g., criteria to be applied generally across all taxonomies of the application and/or taxonomies specific to the motion sensing taxonomy 305a) can result in PIR sensor 308a be selected to be deployed to satisfy the motion sensing asset requirement 305a of the application. Similarly, criteria can be assessed to determine that gateway 308d is the better candidate between it and cloud resource 308c to satisfy the application's computation requirement 305b. For asset requirements (e.g., 305c) where only a single discovered instance (e.g., 308e) of the asset taxonomy is discovered, asset binding is straightforward. Those discovered devices (e.g., 308a, 308d, 308e) that have been selected, or bound, can then be automatically provisioned with resources from or configured by the IoT system manager (e.g., 215) to deploy the application. Unselected assets (e.g., 308b, 308c, 308f) may remain in the environment, but are unused in the application. In some instances, unselected assets can be identified as alternate asset selections (e.g., in the event of a failure of one of the selected assets), allowing for swift replacement of the asset (deployed with the same settings designated for instances of the corresponding taxonomy).

In some instances, asset binding can be modeled as a bipartite matching (or assignment) problem in which the bipartite graph can be expressed by G=(R,A,E) where R denotes the asset requirements, A denotes the available assets and e=(r,a) in E where a in A is capable of r in R. Note that if R requests for n instances of a particular assets, A' can be defined as:

$$\bigcup_n A$$

from which a solution for the (maximum) (weighted) matching problem can be computed. For instance, exhaustive search can be applied as the number of vertices in the bipartite graph are small and the edges are constrained in the sense that there is an edge (r,a) only if a is capable of r.

Figure 3B:
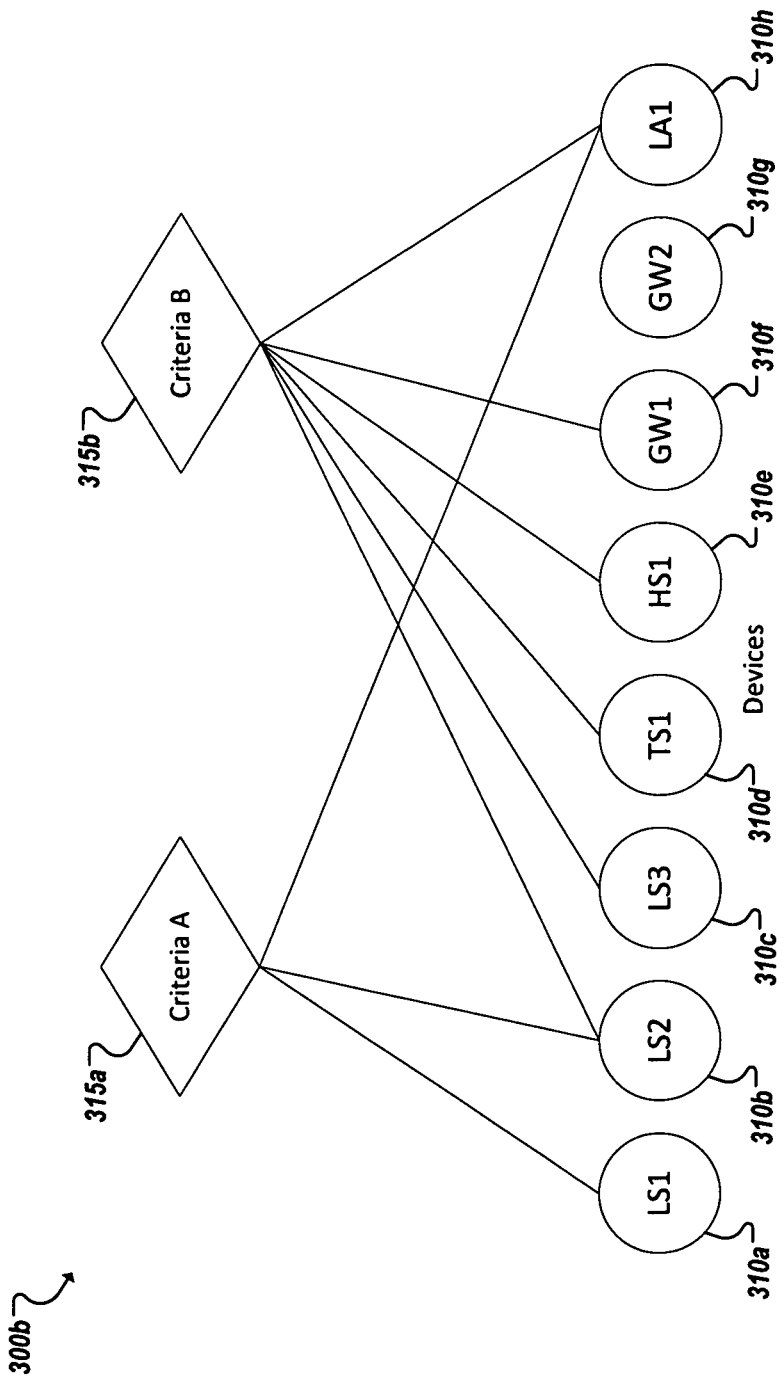
FIG. 3B is a simplified block diagram illustrating an example of asset discovery.

Turning to the simplified block diagram 300b of FIG. 3B, an example of asset discovery is represented. Asset discovery can allow the scope of available devices to be confined based on discovery conditions or criteria, such as conditions relating to device proximity, room, building, movement state, movement direction, security, permissions, among many other potential (and configurable) conditions. The benefits of such targeted discovery can trickle down to asset binding, as unchecked discovery may return many possible bindings, especially in large scale deployment. For example, in a smart factory, the action of "deploying predictive maintenance" may be ambiguous as there may be hundreds of sensors, motors, alarms, etc. in a factory facility. Asset discovery, in some implementations, takes as input a policy or user input from which a set of discovery criteria can be identified. Upon detecting the universe of assets with which the application could potentially operate, the criteria can be used to constrain the set, in some cases, providing a resulting ordered list of available assets, which can be expressed as f:C×D→D, where C denotes criteria, D denotes a set of devices, and the codomain is a totally ordered set.

For instance, in the example of FIG. 3B, two discovery criteria 315a, 315b are identified for an application. Additional criteria may be defined that is only to apply to some or a specific one of the categories, or taxonomies, of assets, among other examples. Based on the defined criteria 315a-b in this example, the output of discovery according to search criteria A 315a leads to the codomain of a subset of devices in the environment—LS1 (310a), LS2 (310b), GW2 (310g) and LA1 (310h), whereas search criteria B results in LS2 (310b), LS3 (310c), TS1 (310d), HS1 (310e), GW1 (310f), and LA1 (310h). Based on the set of defined discovery criteria (e.g., 315a-b), asset discovery can attempt to reduce the total collection of identified assets to a best solution. Additionally, determining the set of discovered assets for binding consideration can incorporate determining a minimum set of discovered devices, based on the asset requirements of the application. For instance, a minimum set can be selected during discovery such that at least one asset of each required taxonomy is present in the set, if possible. For instance, in the example of FIG. 3B, it can be identified (e.g., by an asset discovery module of the system manager) that application of only criteria B (315b) in discovery yields at least one asset for each of the taxonomies defined for the application.

Figure 3C:
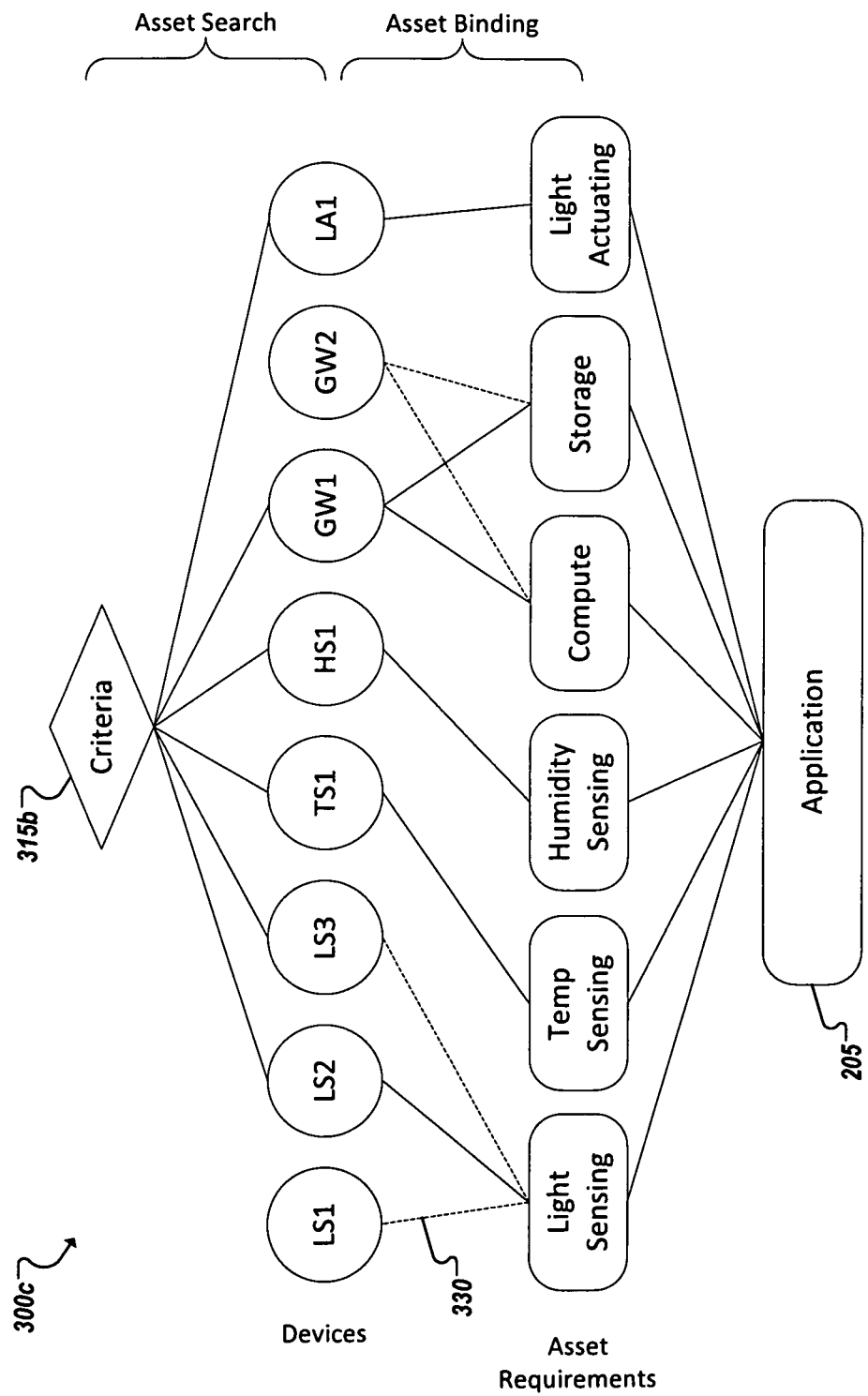
FIG. 3C is a simplified block diagram illustrating an example of asset abstraction and binding using a discovered set of assets.

For instance, the block diagram 300c FIG. 3C illustrates the end-to-end deployment determinations of a system manager. For instance, based on the discovery conducted in the example of FIG. 3B, a subset of the assets (e.g., LS2 (310b), LS3 (310c), TS1 (310d), HS1 (310e), GW1 (310f), and LA1 (310h)) are "discovered" for potential use by the application (e.g., based on their compliance with criteria B (and the underrepresentation of assets in compliance with criteria)). Accordingly, assets LS1 and GW2 are not to bound to the application 205 (as indicated by the dashed lines (e.g., 330)), despite each asset being an instance of one of the asset requirements (e.g., Light Sensing, Compute, and Storage) of the application 205.

As noted above, additional criteria can be defined and applied during asset binding. During binding, where the set of discovered assets include more than one instance of a particular required asset taxonomy (e.g., as with assets L2 and L3 in asset taxonomy Light Sensing), criteria can be applied to automatically select the asset that is the better fit for deployment within the IoT system governed, controlled, or otherwise supported by the application 205. Further, as illustrated in FIG. 3C, it is possible for a single asset instance (e.g., GW1) to both belong to two or more taxonomies and to be selected for binding to the application for two or more corresponding asset requirements (e.g., Compute and Storage), as shown. Indeed, a binding criterion can be defined to favor opportunities where multiple asset requirements of the application can be facilitated through a single asset, among other examples.

As represented generally in FIG. 3C, asset discovery can provide the first level for confining the scope of an asset-to-application asset requirement mapping. A user or developer can specify (in some cases, immediately prior to runtime) the asset requirements for a particular application, and an environment can be assessed to determine whether assets are available to satisfy these asset requirements. Further, the system manager utility can automatically deploy and provision discovered assets to implement that application, should the requisite combination of assets be found in the environment. Additionally, the system manager utility can automatically apply setting values across the deployed assets in accordance with a configuration defined by a user associated with the application. However, if no instances of one or more of the asset requirements (required taxonomies) are discovered, the application may be determined to be un-deployable within the environment. In such cases, a system manager utility can generate an alert for a user to identify the shortage of requested taxonomy instances, including identifying those taxonomies for which no asset instance was discovered within the environment, among other examples.

Figure 4:
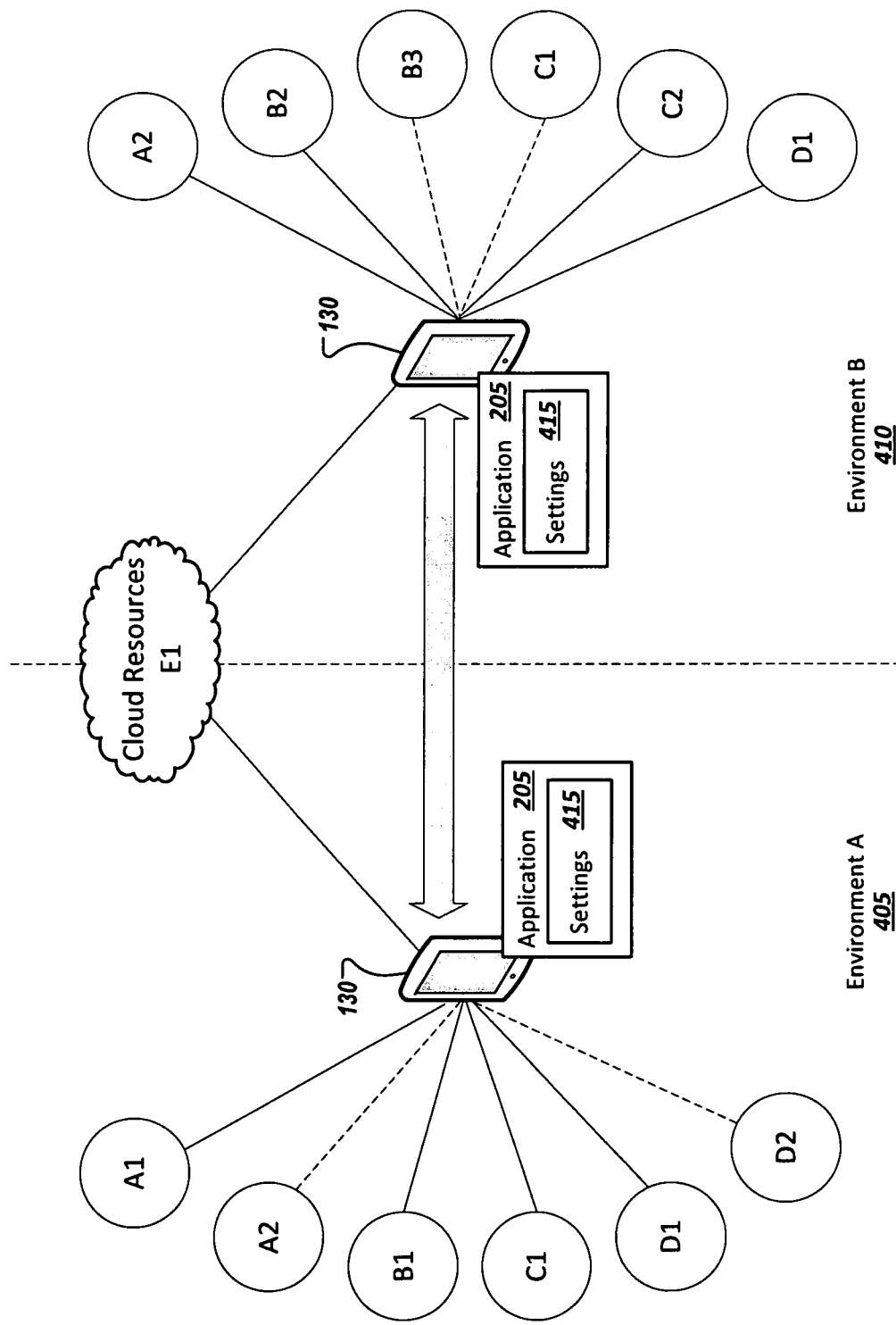
FIG. 4 is a simplified block diagram illustrating an example of managing migration of settings between two instances of a particular machine-to-machine network.

Turning to FIG. 4, as noted above, an application developed according to the principles of asset abstraction, as described herein, can allow a user to use their instance of an application, together with the settings defined for the user's instance, in a variety of different environments. For instance, frequent travelers may prefer to create a home-like environment (e.g., in a hotel, office, or vacation rental remote from their home) by bringing a device hosting at least a portion of an IoT application (and/or IoT system manager) with them during travel. The user can then utilize the application and system manager to deploy a similar system (with potentially different devices), while carrying over their home settings for the system. In another case, home automation users may want to carry over their existing settings with the least human intervention when any device is replaced with a substitute (e.g., due to system failure, malfunction, power loss, etc.) within the system, among other examples.

For instance, as shown in FIG. 4, in a first environment 405, a system manager and application (e.g., 205) hosted on a smartphone 130 can discover a set of assets A1, A2, B1, C1, D1, D2, where assets A1 and A2 are instances of taxonomy A, asset B1 is an instance of taxonomy B, and so on. The application 205, in this example, may have asset requirements corresponding to taxonomies A, B, C, D, and E. Asset binding can be performed, resulting in assets A1, B1, C1, D1 and E1 being selected and deployed while the host device 130 is present in Environment A 405. Further, the system manager can cause settings 415 to be applied throughout the deployed system.

In another, remote environment, Environment B, the same instance of the application 205 and system manager can be utilized to deploy another instance of the application's IoT network. For instance, when brought into Environment B 410, the device 130, through the system manager, can detect a different set of assets as discovered (and present) within Environment A 405. Some of the assets in Environment B may be instances of the same asset (e.g., the same device model) discovered in Environment A (e.g., A2, C1, D1). Some assets may not be strongly tied to location, such as a cloud-based or other remote service asset (e.g., E1), and the same instance of the same asset (e.g., E1) can be discovered and deployed in each environment. In Environment B, not only can a different set of assets be discovered, but a different set of asset can be deployed (e.g., A2, B2, C2, D1, and E1) to satisfy the defined asset requirements of the application 205. Despite the deployments being different between the two environments (e.g., 405, 410), when viewed at the asset abstraction level, the deployments are functional equivalents. Further, the settings 415 (e.g., defined at the asset abstraction level), can be applied equally within each environment 405, 410. As an example, a sensitivity setting value defined in the settings 415 for the taxonomy instance B can be applied equally to each of assets B1 and B2 (and, for that matter, B3, when deployed), allowing the system manager of the application 205 to attempt to achieve equivalent systems utilizing different collections of assets. While, in practice, the resulting systems may not be functionally identical (as differences between the asset instances (e.g., B1 and B2) may manifest, even when configured with the same settings), implementations of the application in varied environments can be at least approximated with minimal effort of the user.

Figure 5:
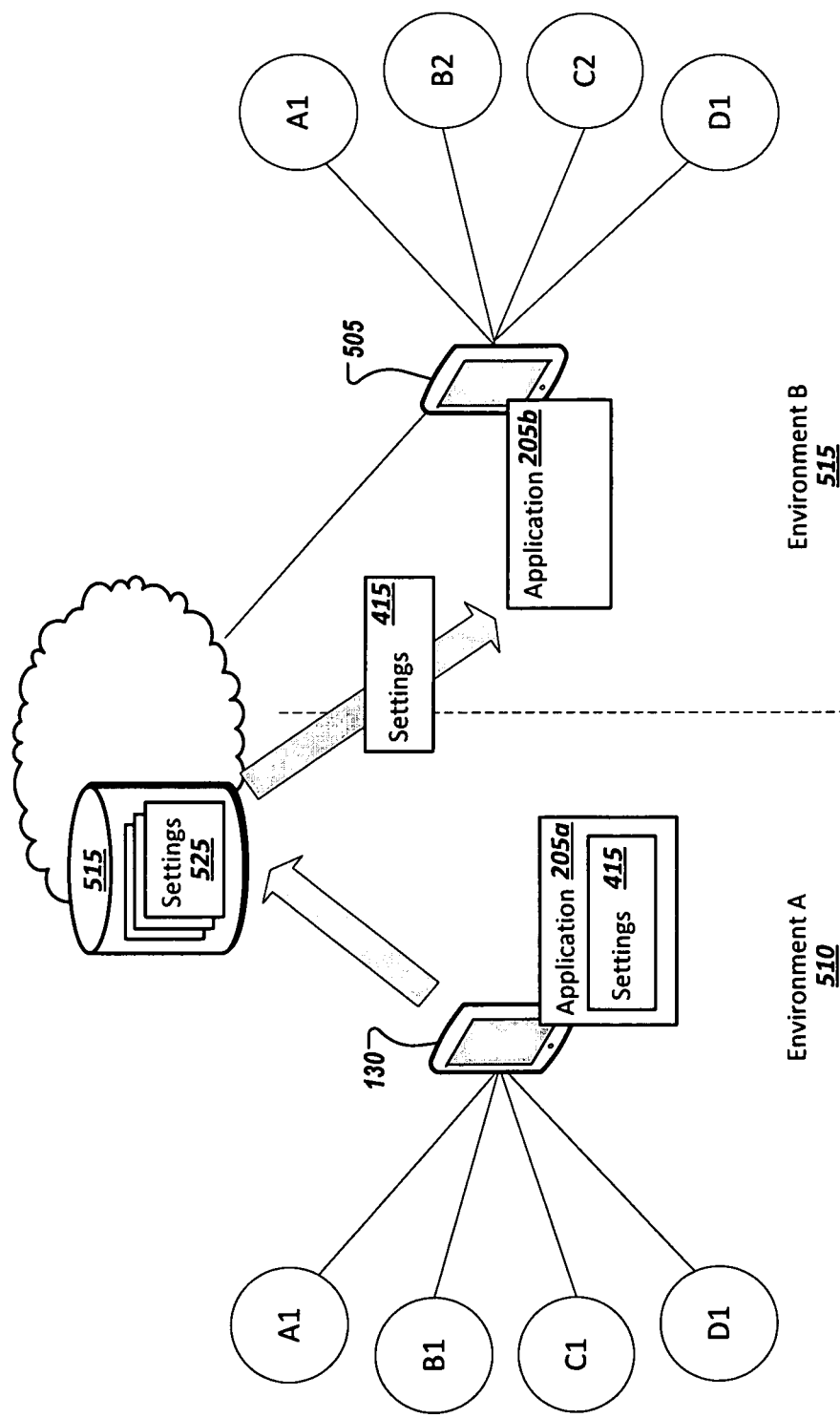
FIG. 5 is a simplified block diagram illustrating sharing of settings between two instances of a particular machine-to-machine network.

Turning to FIG. 5, in some implementations, settings defined by a first user for the first user's instance of a given IoT application (e.g., 205a) hosted at a first device can be shared and applied at a second instance of the same IoT application (e.g., 205b) hosted on the other user's device 505 for deploying assets (e.g., A1, B2, C2, D1) within a corresponding environment 515. For instance, an individual may want to share their preferred smart home/office settings with their friends. Forest, rather than "reinventing the wheel" to determine the ideal balance of settings, a user can simply adopt the settings of another user for application within their own environment (e.g., home automation settings, smart lighting settings, fitness system settings, smart agriculture settings, etc.). For example, a person may be inspired by visiting a friend's home (e.g., environment 510) and desire to apply similar settings to an IoT system within their home (e.g., environment 515).

As shown in FIG. 5, a repository 520 can be provided to store or transfer setting information (e.g., 525) collected from potentially multiple different application systems. For instance, the repository 520 can be a cloud-based repository in some implementations. In other cases, setting information can be shared directly between the hosting devices 130, 505, among other examples. A particular set, or configuration, of settings applied at a first instance of an application (e.g., 205a) can thereby be communicated to another instance of the application (e.g., 205b) to be fully adopted by the other instance of the application and applied to its own IoT deployment (e.g., in environment 515).

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 6:
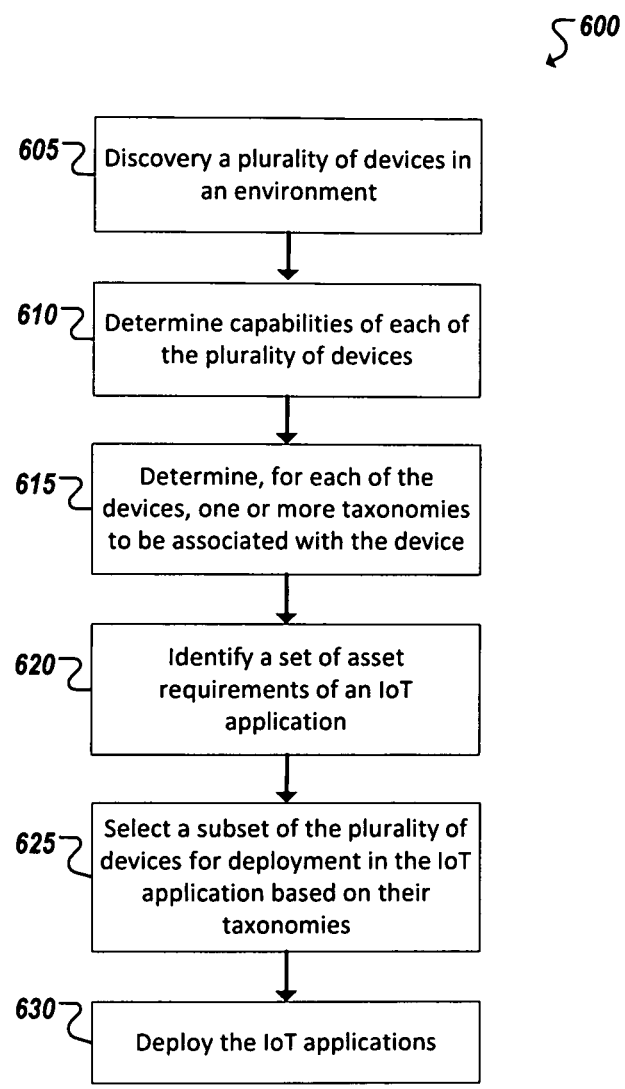
FIG. 6 is a flowchart illustrating an example technique for deploying an example machine-to-machine network utilizing asset abstraction.

FIG. 6 is a simplified flowchart 600 illustrating example technique for deploying an IoT system or other machine-to-machine network. The IoT system may interoperate with, be controlled by, or otherwise associated with a corresponding software application (e.g., an IoT application) hosted on a particular device. A plurality of devices can be discovered 605 in an environment associated with the particular device. For instance, the particular device may be located within the environment, connected to a network associated with the environment, be a registered device associated with the environment, possess authentication credentials associated with the environment, etc. Discovery criteria can be used to determine whether the plurality of devices should be considered part of the environment. Discovery 605 can also be predicated on the particular device being able to access and communicate with the other devices. Functional capabilities can be determined 610 for each of the plurality of devices. Taxonomies can be defined to categorize various devices according to their functional capabilities. An IoT application can be programmed to reference and interface with abstracted instances of a set of taxonomies, or a genericized version of each of a set of different device types. One or more of the defined taxonomies can be determined 615 to apply to each of the discovered devices based on the determined capabilities of the devices. A set of asset requirements for a particular IoT system can be identified 620, each asset requirement referencing one of the taxonomies to indicate that a corresponding instance of a device with corresponding functional capabilities be included in deployments of the particular IoT system. A subset of the discovered devices can be selected 625 as the instances of the asset requirement taxonomies, thereby selecting the subset of devices for deployment in an instance of the IoT system. Other instances of the same IoT system definition can be determined and deployed (e.g., in other, different environments) and include different device selections for the asset requirements. The IoT system can then be deployed 630, for instance, by communicating (e.g., the IoT application sending instructions from the particular device to the selected devices) system configuration information and instructions to at least some of the selected devices. The deployment 630 can involve provisioning executable code on one or more of the selected devices for use in implementing the IoT system and interoperability of the selected subset of devices, as well as to apply a defined set of setting values for the IoT system, among other tasks.

Figure 7:
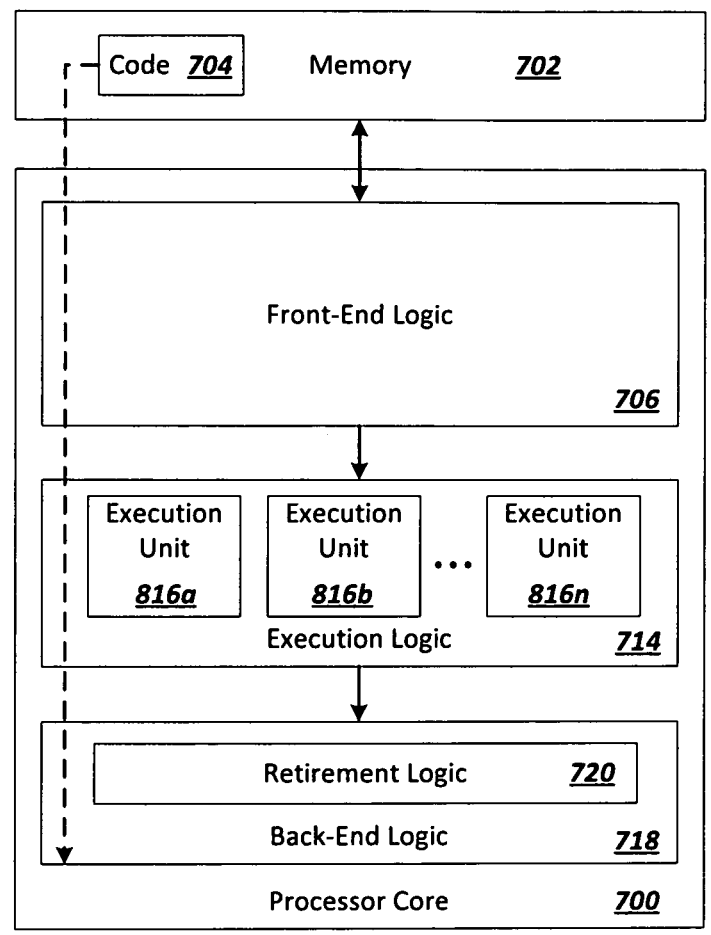
FIG. 7 is a block diagram of an exemplary processor in accordance with one embodiment.
Figure 8:
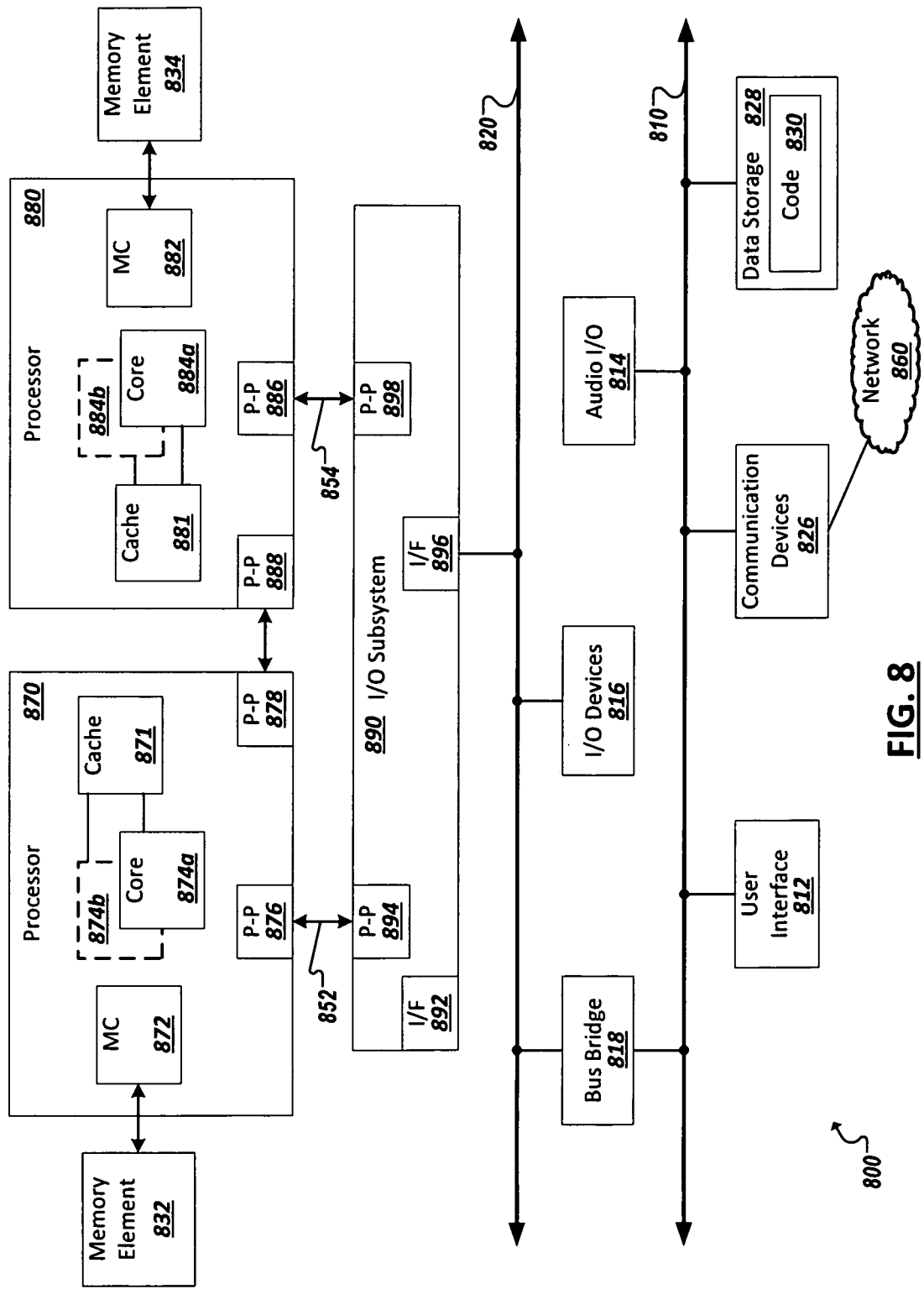
FIG. 8 is a block diagram of an exemplary computing system in accordance with one embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a method, a system, a machine readable storage medium with executable code to detect a plurality of devices within range of a particular device, determine capabilities of each of the plurality of devices, determine, for each of the plurality of devices, a respective one of a set of taxonomies to be associated with the device based on the determined capabilities of the device, and identify a set of asset abstractions referenced by a particular software application configured to manage a particular machine-to-machine network. Each asset abstraction can correspond to a respective one of the set of taxonomies, and the particular machine-to-machine network can be built from an instance of each one of the set of asset abstractions. A subset of the plurality of devices can be selected for deployment as an instance of the particular machine-to-machine network based on taxonomies associated with the subset of devices, the subset of devices representing an instance of each one of the set of asset abstractions, and the subset of devices can be deployed to implement the instance of the particular machine-to-machine network.

In one example, each of the set of taxonomies correspond to a respective functional capability of a device, and association with a taxonomy indicates that a device possesses the corresponding functional capability.

In one example, the taxonomies each abstract implementation details of the corresponding functional capability on associated devices.

In one example, the particular device hosts at least a portion of the particular application.

In one example, deploying the instance of the particular machine-to-machine network includes provisioning one or more of the subset of devices with code includes a portion of code for use in the particular machine-to-machine network.

In one example, detecting the plurality of devices within range of a particular device includes determining that each of the plurality of devices is communicatively accessible to the particular device, and determining that each of the plurality of devices satisfy one or more discovery criteria in a set of discovery criteria defined for the particular machine-to-machine network.

In one example, at least one criterion in the set of discovery criteria is agnostic to proximity of a device to the particular device.

In one example, selecting the subset of devices includes identifying that two or more of the detected plurality of devices are each associated with a particular taxonomy corresponding to a particular one of the set of asset abstractions, identifying binding criteria defined for the particular machine-to-machine network, and assessing attributes of each of the two or more devices to determine which of the two or more devices better satisfies the binding criteria.

In one example, at least a portion of the binding criteria is for particular use in selecting a device to represent the particular asset abstraction in the particular machine-to-machine network.

In one example, the set of taxonomies includes at least one sensor taxonomy, at least on actuator taxonomy, at least one computational taxonomy, at least on data storage taxonomy, and at least one computer communications.

In one example, deploying the instance of the particular machine-to-machine network includes identifying a set of setting values defined for the particular machine-to-machine network and causing the set of setting values to be applied to the subset of devices.

In one example, the instance of the particular machine-to-machine network includes a first instance and the subset of devices includes a first subset of devices.

In one example, a different, second subset of devices can be selected for deployment as a second instance of the particular machine-to-machine network, the second subset of devices including an instance of each one of the set of asset abstraction, and the set of setting values can be caused to be applied to deployment of the second instance of the particular machine-to-machine network.

In one example, the plurality of devices includes a first plurality of devices in a first environment, and a second plurality of devices can be detected in a different, second environment, the second subset of devices including a subset of the second plurality of devices.

In one example, the set of setting values include user-defined setting values.

In one example, data is sent, identifying the set of setting values, over a network for access by another system for use by the other system in deploying another instance of the particular machine-to-machine network.

In one example, the other instance of the particular machine-to-machine network includes a second subset of devices different from the first subset of devices.

In one example, the particular machine-to-machine network implements an IoT system.

One or more embodiments may provide a system including at least one processor, at least one memory element, and an Internet of Things (IoT) system manager. The IoT system manager can be executable by the processor to detect a plurality of devices within range of a particular device, determine capabilities of each of the plurality of devices, determine, for each of the plurality of devices, a respective one of a set of taxonomies to be associated with the device based on the determined capabilities of the device, identify a set of asset abstractions referenced by a particular software application configured to manage a particular machine-to-machine network, select a subset of the plurality of devices for deployment as an instance of the particular machine-to-machine network based on taxonomies associated with the subset of devices, the subset of devices including an instance of each one of the set of asset abstractions; and communicate with one or more of the subset of devices to deploy the instance of the particular machine-to-machine network. Each asset abstraction can correspond to a respective one of the set of taxonomies, and the particular machine-to-machine network can include an instance of each one of the set of asset abstractions;

In one example, the system further includes the particular software application, where the particular software application is hosted, at least in part, on the particular device.

In one example, the IoT system manager is also hosted, at least in part, on the particular device.

In one example, the subset of devices are selected based on a determination that the subset of devices satisfy one or more discovery criteria in a set of discovery criteria.

In one example, the system further includes an IoT application programming tool to generate the particular application based on a user-provided definition of the set of asset abstractions, where the set of asset abstractions is identified as a subset of corresponding taxonomies from the set of taxonomies.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one non-transitory machine accessible storage medium having code stored thereon, the code when executed on a machine, causes the machine to:
    detect a plurality of devices within range of a particular device;
    determine capabilities of each of the plurality of devices;
    determine, for each of the plurality of devices, a respective one of a set of taxonomies to be associated with the device based on the determined capabilities of the device;
    identify a set of device abstractions referenced by a particular software application, wherein the particular software application is configured to organize a particular machine-to-machine network to perform a particular function associated with the particular software application, each device abstraction corresponds to a respective functionality to be used to realize the particular function, and the particular machine-to-machine network is defined by the particular software application to comprise an instance of each one of the set of device abstractions to enable performance of the particular function;
    select a subset of the plurality of devices for deployment as an instance of the particular machine-to-machine network based on taxonomies associated with the subset of devices, wherein the subset of devices are selected to provide at least one device as a respective instance of each one of the set of device abstractions;
    communicate with one or more of the subset of devices to deploy the instance of the particular machine-to-machine network, wherein deploying the instance of the particular machine-to-machine network comprises provisioning one or more of the subset of devices with code to be executed by respective devices in the subset of devices to cause performance of the particular function; and
    initiate performance of the particular function by the particular machine-to-machine network.

2. The storage medium of claim 1, wherein each of the set of taxonomies correspond to a respective functional capability of a device, and association with a taxonomy indicates that a device possesses the corresponding functional capability.

3. The storage medium of claim 2, wherein the taxonomies each abstract implementation details of the corresponding functional capability on associated devices.

4. The storage medium of claim 1, wherein the particular device hosts at least a portion of the particular application.

5. The storage medium of claim 1, wherein detecting the plurality of devices within range of a particular device comprises:
    determining that each of the plurality of devices is communicatively accessible to the particular device; and
    determining that each of the plurality of devices satisfy one or more discovery criteria in a set of discovery criteria defined for the particular machine-to-machine network.

6. The storage medium of claim 5, wherein at least one criterion in the set of discovery criteria is agnostic to proximity of a device to the particular device.

7. The storage medium of claim 1, wherein selecting the subset of devices comprises:
    identifying that two or more of the detected plurality of devices are each associated with a particular taxonomy corresponding to a particular functionality associated with a particular one of the set of device abstractions;
    identifying binding criteria defined for the particular machine-to-machine network; and
    assessing attributes of each of the two or more devices to determine which of the two or more devices better satisfies the binding criteria; and
    selecting a particular one of the two or more devices for inclusion in the subset of devices based on the particular device better satisfying the binding criteria.

8. The storage medium of claim 7, wherein at least a portion of the binding criteria is for particular use in selecting a device to represent the particular device abstraction in the particular machine-to-machine network.

9. The storage medium of claim 1, wherein the set of taxonomies comprises at least one sensor taxonomy, at least one actuator taxonomy, at least one computational taxonomy, at least one data storage taxonomy, and at least one computer communications.

10. The storage medium of claim 1, wherein deploying the instance of the particular machine-to-machine network comprises identifying a set of setting values defined for the particular machine-to-machine network and causing the set of setting values to be applied to the subset of devices.

11. The storage medium of claim 10, wherein the instance of the particular machine-to-machine network comprises a first instance and the subset of devices comprises a first subset of devices, and the instructions, when executed, further cause the machine to:
    select a different, second subset of devices for deployment as a second instance of the particular machine-to-machine network, wherein the second subset of devices comprises an instance of each one of the set of device abstractions; and
    cause the set of setting values to be applied to deployment of the second instance of the particular machine-to-machine network to perform the particular function.

12. The storage medium of claim 11, wherein the plurality of devices comprises a first plurality of devices in a first environment, and the instructions, when executed, further cause the machine to detect, in a different, second environment, a second plurality of devices, wherein the second subset of devices comprises a subset of the second plurality of devices.

13. The storage medium of claim 10, wherein the set of setting values comprise user-defined setting values.

14. The storage medium of claim 10, wherein the instructions, when executed, further cause the machine to send data identifying the set of setting values over a network for access by another system for use by the other system in deploying another instance of the particular machine-to-machine network.

15. The storage medium of claim 14, wherein the other instance of the particular machine-to-machine network comprises a second subset of devices different from the first subset of devices.

16. The storage medium of claim 1, wherein the particular machine-to-machine network comprises an Internet of Things (IoT) system.

17. A method comprising:
 detecting a plurality of devices within range of a particular device;
 determining capabilities of each of the plurality of devices;
 determining, for each of the plurality of devices, a respective one of a set of taxonomies to be associated with the device based on the determined capabilities of the device;
 identifying a set of device abstractions referenced by a particular software application, wherein the particular software application is configured to organize a particular machine-to-machine network to perform a particular function associated with the particular software application, each device abstraction corresponds to a respective functionality to be used to realize the particular function, and the particular machine-to-machine network is defined by the particular software application to comprise an instance of each one of the set of device abstractions to enable performance of the particular function;
 selecting a subset of the plurality of devices for deployment as an instance of the particular machine-to-machine network based on taxonomies associated with the subset of devices, wherein the subset of devices are selected to provide at least one device as a respective instance of each one of the set of device abstractions;
 communicating with one or more of the subset of devices to deploy the instance of the particular machine-to-machine network, wherein deploying the instance of the particular machine-to-machine network comprises provisioning one or more of the subset of devices with code to be executed by respective devices in the subset of devices to cause performance of the particular function; and
 initiating performance of the particular function by the particular machine-to-machine network.

18. A system comprising:
 at least one processor;
 at least one memory element;
 an Internet of Things (IoT) system manager, executable by the processor to:
  detect a plurality of devices within range of a particular device;
  determine capabilities of each of the plurality of devices;
  determine, for each of the plurality of devices, a respective one of a set of taxonomies to be associated with the device based on the determined capabilities of the device;
  identify a particular software application programmed to organize a particular machine-to-machine network to perform a particular function;
  identify a set of device abstractions referenced by the particular software application, wherein each device abstraction corresponds to a respective functionality to be used to realize the particular function, and the particular machine-to-machine network is defined by the particular software application to comprise an instance of each one of the set of device abstractions to enable performance of the particular function;
  select a subset of the plurality of devices for deployment as an instance of the particular machine-to-machine network based on taxonomies associated with the subset of devices, wherein the subset of devices comprises an instance of each one of the set of device abstractions; and
  communicate with one or more of the subset of devices to deploy the instance of the particular machine-to-machine network, wherein deploying the instance of the particular machine-to-machine network comprises provisioning one or more of the subset of devices with code to be executed by respective devices in the subset of devices to cause performance of the particular function.

19. The system of claim 18, further comprising the particular software application, wherein the particular software application is hosted, at least in part, on the particular device.

20. The system of claim 19, wherein the IoT system manager is also hosted, at least in part, on the particular device.

21. The system of claim 18, further comprising an IoT application programming tool to generate the particular application based on a user-provided definition of the set of device abstractions, wherein the set of device abstractions is identified as a subset of corresponding taxonomies from the set of taxonomies.

* * * * *